United States Patent [19]

Campagne et al.

[11] 4,380,555

[45] Apr. 19, 1983

[54] SUCROGLYCERIDE ON A SUPPORT

[75] Inventors: Jean-Claude Campagne; Jean Chollet; Pierre Redien, all of Melle, France

[73] Assignee: Rhone Poulenc Industries, Paris, France

[21] Appl. No.: 245,443

[22] Filed: Mar. 19, 1981

[30] Foreign Application Priority Data

Mar. 24, 1980 [FR] France ............................... 80 06463

[51] Int. Cl.³ ........................ A21D 2/00; A23D 5/00
[52] U.S. Cl. ................................... 426/549; 426/611; 426/653; 426/654; 426/658
[58] Field of Search ............... 426/549, 656, 658, 611, 426/62, 653.4; 536/119

[56] References Cited

FOREIGN PATENT DOCUMENTS

| 1926938 | 12/1970 | Fed. Rep. of Germany | 426/653 |
|---|---|---|---|
| 1483176 | 6/1966 | France | 426/653 |
| 2067391 | 8/1971 | France | 426/653 |
| 51-1044689 | 4/1976 | Japan | 426/62 |

*Primary Examiner*—Thomas G. Wiseman
*Assistant Examiner*—Elizabeth A. Hatcher

[57] ABSTRACT

A novel powder preparation, comprising a base of a sucroglyceride on a support of an edible salt of casein and a maltodextrin.

The powder preparation is easy to handle and to incorporate into a dough, and it improves certain rheological properties of the dough. The powder preparation provides particular advantages in dough for baking crackers, industrial bakery products, leavened and unleavened flake pastry, lining pastry, and the like.

22 Claims, No Drawings

SUCROGLYCERIDE ON A SUPPORT

BACKGROUND OF THE INVENTION

This invention relates to a novel sucroglyceride powder preparation, a novel process for obtaining the powder preparation and the novel uses of the powder preparation, for example, in dough for cakes, crackers, pastries, and other bakery products.

The term "sucroglyceride" has been used to describe the mixture of products obtained when sucrose (i.e., ordinary sugar) is reacted with a natural or synthetic triglyceride. Generally, a sucroglyceride comprises a mixture of monoglycerides, small amounts of unreacted triglyceride, and monoesters and diesters of sucrose in varying proportions, depending on the nature of the triglyceride used, and the proportion thereof relative to the sucrose used. A sucroglyceride can also include esters of sucrose, ranging from triesters to octaesters. By the term "combined sucrose" is generally meant all such esters of sucrose.

Sucroglycerides have important emulsifying properties due, in particular, to the sucrose mono- and di-esters and to the monoglycerides. They are non-ionic emulsifiers which are completely biodegradable, non-toxic, odorless, tasteless, and readily accepted by living organisms. Accordingly, they have been used in animal and human food and more particularly in food products such as: cake, cracker, pastry and other bakery products, confectionary and chocolate-candy products, fats, sauces, condiments, ravioli, cannelloni, custards, and creams.

The use of sucroglycerides in cakes, crackers and pastries has been known to allow shorter mixing times and shorter kneading times of their dough, easier incorporation of grease into their dough, and easier working of their dough. Additionally, sucroglycerides have been known to provide a finer texture of dough in products containing them. See, for example, French Pat. No. 1,483,176.

However, the use of sucroglycerides has involved problems due to their physical form. In pure state, sucroglycerides have been thick and waxy. This has made it necessary either to melt sucroglycerides before adding them to dough or to place them in an aqueous dispersion, in which they can then be added to dough. At present, sucroclycerides are generally used in a pasty, rather than a fluid, form which is the result of emulsification with sugar and water. Such a pasty form makes sucroglycerides more readily dispersible in dough, but such a form is not easy to handle. Furthermore, such a form is not suitable for certain applications, particularly for the production of flour mixes which require a powdered form.

Other, easier handling forms of sucroglycerides have therefore been sought. In particular, a powdered form of sucroglycerides has been sought which makes it possible to retain the valuable properties of sucroglycerides but which allows sucroglycerides to be more easily incorporated into dough.

SUMMARY OF THE INVENTION

In accordance with this invention, a powder preparation is provided which comprises a sucroglyceride on a support, comprising an edible salt of casein and a maltodextrin.

This novel sucroglyceride powder preparation makes it possible to retain the valuable properties, contributed by a sucroglyceride to dough, and to incorporate the sucroglyceride more easily into the dough. In addition, the powder preparation has synergistic effects on the dough. For example, the powder preparation in dough provides: better homogeneity of the dough; a reduction of the energy necessary for kneading the dough; easier working of the dough; a longer life for products made from the dough, before they become stale; and increased development of products made from the dough.

DETAILED DESCRIPTION OF THE PREFERRED EMBODIMENTS

The powder preparation of this invention has a base which comprises a sucroglyceride. The sucroglyceride base is placed on a support which comprises an edible salt of casein and a maltodextrin.

The sucroglyceride can be obtained in accordance with this invention by the transesterification of a triglyceride with sucrose. By the term "triglyceride" is meant one or more triglycerides of saturated or unsaturated aliphatic fatty acids having at least 12 carbon atoms and preferably 14 to 20 carbon atoms. A synthetic triglyceride, obtained by reacting glycerol with a fatty acid, can be used to make the sucroglyceride. However, it is preferred for economic reasons to use a natural triglyceride, which is a mixture of triglycerides, to make the sucroglyceride. Examples of suitable natural triglycerides are lard, tallow, peanut oil, butter oil, cottonseed oil, linseed oil, coconut oil, olive oil, palm oil, grapeseed oil, fish oil, soya oil, castor oil and copra oil. The preferred triglyceride of this invention is a fatty acid triglyceride which has not more than one double bond. Among such preferred triglycerides are triglycerides which have been hydrogenated in order to reduce their number of unsaturated bonds, such as hydrogenated tallow.

The sucroglyceride can be obtained by any conventional method of transesterifying a triglyceride with sucrose. For example, sucrose and a triglyceride can be reacted in a solvent, such as dimethylformamide, in the presence of anhydrous potassium carbonate at a temperature of about 95° C. (as disclosed in Italian Pat. No. 650,389). Alternatively, the transesterification reaction can be carried out in other solvents, such as in pyridine (as disclosed in U.S. Pat. No. 2,831,855), in derivatives of morpholine or piperidine (as disclosed in U.S. Pat. No. 2,831,856), or in dimethylsulfoxide (as disclosed in U.S. Pat. No. 2,812,324)—provided that the resulting sucroglyceride can be tolerated in food and does not contain physiologically disturbing make subsequent purification operations necessary. For instance, in a process employing dimethylformamide as the reaction solvent, the resulting sucroglyceride must contain less than 5 p.p.m. of residual solvent.

The sucroglyceride also can be obtained by a solventless process which employs either a fine dispersion of sucrose (as disclosed in French patent of addition No. 2,029,598) or a high temperature such as 190° C. (as disclosed in French Pat. No. 2,047,603) or a long reaction time of about 10–20 hours (as disclosed in French Pat. No. 2,221,436).

Preferably, the sucroglyderide is obtained by transesterification of sucrose and a triglyceride which has undergone a limited alcoholysis before the transesterification (as disclosed in French patent application No. 79/20 758). In this preferred process: the triglyceride and ethanol are reacted in the presence of potassium carbonate at reflux temperature under atmospheric pressure for 2 to 2½ hours; within about 30 minutes, sucrose and additional potassium carbonate are added, with agitation, at a temperature of 120°–130° C., under an inert gas atmosphere, to the reaction medium which already contains a potassium soap; and then, the temperature of the reaction mixture is increased to 130°–135° C., while reducing the pressure to about 150 mm of mercury and continuing to heat the reaction mixture up to a total reaction time of 4–5 hours. The resulting mixture is then either used as is or is neutralized to a greater or lesser extent with, for example, acetic, phosphoric, citric or lactic acid. The mixture can then be purified in a conventional manner.

However the sucroglyceride is obtained, it is generally necessary to carry out a purification step, such as is disclosed, for example, in French Pat. No. 1,338,709 and French Pat. No. 1,350,654.

The preferred sucroglycerides are made from one of the following triglycerides: palm oil, lard, copra oil or tallow. The preferred sucroglycerides are generally in the form of pastes of varying consistency and are distinguished commercially by their melting points:

lard sucroglyceride: 47°–50° C.
tallow sucroglyceride: 50°–55° C.
palm oil sucroglyceride: 55°–58° C.
copra oil sucroglyceride: 60°–62° C.

The edible salt of casein or the caseinate is preferably obtained from pure casein. Casein, which is the principal protein of milk, can be obtained in a conventional manner from a completely skimmed milk by: coagulation with rennet; acidification by lactic fermentation; or addition of lactic or hydrochloric acid. The caseinate can be obtained from the resulting casein curd in a conventional manner by: washing the curd to remove inorganic salts, lactose and excess acid; dissolving the curd in an aqueous base such as sodium hydroxide, potassium hydroxide, lime or ammonia; and then dehydrating the basic solution.

Edible salts of casein are commercially available in the form of a dry powder, containing at least 75% milk protein (i.e., pure casein or its hydrolysis products), the balance being lactose or impurities (i.e., lactic acid and traces of metals).

In accordance with this invention, any conventional edible salt of casein can be utilized. Sodium or potassium caseinates are preferably employed as the edible salt of casein. The most common such salt is sodium caseinate.

The maltodextrin is obtained by a more or less complete hydrolysis of corn starch or potato starch. The hydrolysis can be effected by an acid (e.g., hydrochloric acid), but it is most generally carried out enzymatically by means of alpha-amylase. The hydrolysis produces a mixture, containing dextrose, maltose and oligosaccharides and polysaccharides, the proportions of which are a function of the manner and degree of hydrolysis. The degree of hydrolysis can be determined from the total amount of reducing sugars, which can be expressed as dextrose equivalent (or "D.E."). The D.E. of the maltodextrin is the number of grams of reducing sugars, considered as dextrose (chemically pure d-glucose), in 100 g of the maltodextrin. The D.E. therefore measures the intensity of the hydrolysis of the starch, since the greater the number of small molecules (such as dextrose and maltose) in the maltodextrin, the higher its D.E., and the greater the number of large molecules (polysaccharides) in the maltodextrin, the lower its D.E. The D.E. scale is as follows: 100 for dextrose, 50 for maltose, and 0 for starch. In accordance with this invention, any conventional maltodextrin, having a low D.E. of 3–40, preferably 6–30, can be utilized.

The novel sucroglyceride powder preparation of this invention combines one or more sucroglycerides with one or more edible salts of casein and one or more maltodextrins in proportions which can vary within wide limits. The percentages by weight of the components of this powder preparation preferably are:

20–40% sucroglyceride,
10–50% caseinate, and
20–60% maltodextrin.

Various adjuvants, such as lecithin, fat, etc., can also be added to the powder preparation of this invention.

The powder preparation of this invention can be prepared by numerous methods. One method involves drying an aqueous emulsion of a sucroglyceride, a caseinate and a maltodextrin. The sucroglyceride a water bath or in a jacketed vessel) at 60°–80° C. An aqueous solution of the caseinate and the maltodextrin, having a solids content of 20–40%, is prepared separately, with agitation, at 60°–80° C. The molten sucroglyceride is then added to the aqueous solution of the caseinate and maltodextrin while continuing to agitate the solution until the temperature of the mixture cools to 40°–50° C. The resultant coarse emulsion is homogenized (e.g., in a conventional homogenizer by forcing the coarse emulsion through draw plates or screw threads in order to reduce the dimensions of the globules of the sucroglyceride). The resultant fine emulsion is then dried by spraying or any other equivalent process, (e.g., drying in a spray tower with a stream of hot air at a temperature of 150°–240° C.). The dried emulsion, after cooling, comprises the powder preparation of this invention.

Another method of preparing the powder preparation of this invention involves powder-to-powder mixing of a maltodextrin with a sucroglyceride on a support of a caseinate. In this method, the sucroglyceride is melted (e.g., in a water bath or in a jacketed vessel) at 60°–80° C. An aqueous solution of the caseinate is prepared, with agitation, at 60°–80° C. The melted sucroglyceride is added to the aqueous caseinate solution with agitation of the caseinate solution until the temperature of the mixture cools to 40°–50° C. The resultant coarse emulsion can be homogenized to a fine emulsion in the manner utilized above in the first method. Then, the emulsion is dried in the manner utilized above. The powder obtained comprising the sucroglyceride on the caseinate support, is mixed with the maltodextrin, also in the form of a powder, in a conventional powder mixer (e.g., a drum-type, free-fall mixer, a vertical or horizontal screw mixer, or a horizontal Lödige type mixer) to provide the powder preparation of this invention.

Yet another method of preparing the powder preparation of this invention involves the powder-to-powder mixing of a caseinate with a sucroglyceride on a support of a maltodextrin. In this method, the sucroglyceride is melted as above. An aqueous solution of maltodextrin is prepared, with agitation, at 60°–80° C. as above. The molten sucroglyceride is added to the aqueous solution of maltodextrin, which is maintained under agitation, as above. The resultant coarse emulsion can be homogenized, and it is then dried as above. The powder obtained, comprising the sucroglyceride on the maltodextrin support, is mixed with the caseinate, also in the form of a powder, in a conventional powder mixer, as above, to provide the powder preparation of this invention.

The sucroglyceride powder preparation of this invention can be used in the production of a dough. By the term "dough" is meant a mixture comprising a grain flour (e.g., wheat flour) and water. Dough, containing the powder preparation, can be used in the preparation of, for example, custards and cream desserts, sauces, condiments, ravioli or canneloni. One preferred field of use for dough, containing the powder preparation, is for baking:
- dry crackers, ordinary sugar crackers, petit beurres, biscuits, snack crackers, sand crackers, salted crackers for aperitifs and English-type crackers;
- industrial bakery products: boudoirs, champagnes, cat tongues, tea biscuits, genoa bread, genoise cake, madeleines, quatre-quarts, cakes, almond pastry, petit-fours;
- leavened flake pastry (croissants) and non-leavened flake pastry (vol-au-vent); and
- lining pastry (shortbread, sweetened or unsweetened shortened doughs, caterer type).

The fundamental ingredients present in dough for such baked products are proteins (gluten) and starch which generally come from the flour. For preparing the various types of cookies and cakes, ingredients, such as sucrose, salt, eggs, milk, fat, possibly chemical leavening agents (sodium bicarbonate or other artificial yeast) or biological yeasts and flours of other grains, etc., are added to the flour in the dough.

The powder preparation of this invention can be added to dough during the preparation of the dough by conventional techniques, governed by the desired products. Such conventional techniques are described in Kiger and Kiger, "Techniques Modernes de la Biscuiterie Pâtisserie", Boulangerie Industrielles et Artisanales et des Produits de Régime, DUNOD, Paris, volume 2, pp. 231 et seq (1968).

The powder preparation of this invention can be used either as is or else mixed with other powdered substances (e.g., lecithin) in order to facilitate its dispersion in the medium into which it is to be incorporated. When used in dough, the powder preparation preferably is introduced together with the other powdered components of the dough (i.e., with the flour or sucrose) or is introduced subsequently into the dough at the start of kneading. The quantity of the powder preparation, used, is not critical but preferably represents, expressed in weight of sucroglyceride, 0.3-2% of the weight of flour, employed.

The addition of the powder preparation of this invention to dough during the manufacture of the dough modifies the rheological properties of the dough and affects the behavior of the dough during the manufacture of baked products. The powder preparation also affects the characteristics of the finished baked products, made from the dough containing the powder preparation.

The following Examples I to IV illustrate processes for obtaining a powder preparation of this invention from a sucroglyceride, a sodium salt of casein, and a maltodextrin. Examples V to XXXVI illustrate the use of, and advantages provided by, the powder preparations of Examples I-IV in dough. Percentages are by weight in the Examples.

The sucroglyceride, used in the Examples I-XXXVI is a palm oil sucroglyceride, sold by RHONE-POULENC under the brand name CELYNOL MPSO 11 and having the following characteristics:

| Combined sugar | 19 ± 2% |
| Free sugar | ≦1.5% |
| Acid number in mg of KOH/g | ≦8 |
| Saponification number in mg of KOH/g | 150 ± 10 |
| Density at 66° C. | 0.97 |
| Viscosity in centistokes at 98.9° C. | 210 ± 80 |
| Melting range | 50–60° C. |

The maltodextrin, used in the Examples, is a powder having the following characteristics:

| Hydrocarbons: | |
| dextrose | 2 |
| maltose | 6 |
| polysaccharides | 92 |
| starch | 0 |
| Dextrose Equivalent (D.E.) | 19–21 |
| Specific rotatory power | +175°. |

The sodium caseinate, used in the Examples, is a powder.

EXAMPLE I

A powder preparation of this invention is made by powder-to-powder mixing of the maltodextrin with the sucroglyceride on the caseinate support.

The sucroglyceride is placed on the caseinate by initially melting 40 kg of the sucroglyceride at 75° C. in a 100-liter jacketed tank, provided with a slow agitation device.

At the same time, 180 liters of drinking water are placed in a 500-liter jacketed tank, provided with an agitation device, and brought to 40° C. 40 kg of the caseinate are added to the water with agitation. Then, this solution is heated to 60° C.

The melted sucroglyceride is added slowly over the course of 5 minutes to the aqueous caseinate solution, which is maintained under agitation. Then, the resulting mixture is cooled to 40° C. while continuing the agitation.

The emulsion formed is introduced into a MAN-TONGAULIN pressure homogenizer in which homogenization is effected under a pressure of 200 bars. The resultant homogenized emulsion is dried in a spray tower provided with a turbine pulverization device using a stream of hot air at 185° C. 65 kg of the sucroglyceride on the caseinate are recovered.

800 g of the sucroglyceride on the caseinate are mixed in a powder mixer with 200 g of the maltodextrin to give a powder preparation of:

| sucroglyceride | 40% |
| caseinate | 40% |
| maltodextrin | 20%. |

EXAMPLE II

A powder preparation of this invention is made by drying an aqueous emulsion containing the sucroglyceride, the caseinate and the maltodextrin by means of a spray drying process.

The sucroglyceride is placed on the caseinate and maltodextrin support by initially melting 35 kg of the sucroglyceride at 70° C. in a jacketed 100-liter tank, provided with a slow agitation device.

At the same time, 200 liters of drinking water are place in a 500-liter jacketed tank, provided with an agitation device, and 20 kg of the caseinate and 45 kg of the maltodextrin are added with agitation. Then, this solution is heated to 60° C.

The melted sucroglyceride is added slowly over the course of 5 minutes to the aqueous solution of the caseinate and maltodextrin, which is maintained under agitation. Then, the resulting mixture is cooled to 45° C. while continuing the agitation.

The emulsion formed, is introduced into a MAN-TONGAULIN pressure homogenizer in which homogenization is effected under a pressure of 200 bars. The resultant homogenized emulsion is dried in a spray tower, provided with a turbine spray device, using a stream of hot air at 185° C.

85 kg of the sucroglyceride on the caseinate and maltodextrin support are recovered. This powder preparation has the following composition:

| sucroglyceride | 35% |
| caseinate | 20% |
| maltodextrin | 45%. |

EXAMPLE III

A powder preparation of this invention is prepared by the powder-to-powder mixing of the caseinate with the sucroglyceride on the maltodextrin support. The sucroglyceride is placed on the maltodextrin support using the same procedure used in Example I to place the sucroglyceride on the caseinate support. The powder preparation comprises:

| sucroglyceride | 20% |
| caseinate | 45% |
| maltodextrin | 35%. |

EXAMPLE IV

A powder preparation of this invention is prepared by drying an aqueous emulsion containing the sucroglyceride, the caseinate and the maltodextrin, using the procedure of Example II. The powder preparation comprises:

| sucroglyceride | 30% |
| caseinate | 15% |
| maltodextrin | 55%. |

In the Examples V to XXXVI, which follow, Examples XIII, XVIII, XXVII and XXXVI show the synergistic effects, provided by the powder preparation of this invention in dough. The effects studied are: action on gluten, measured by the BRABENDER farinograph and the CHOPIN alveograph; action on starch, measured by the BRABENDER amylograph; and action on fermentation activity and tolerance, measured by the CHOPIN zymotachygraph. For purposes of comparison, Examples V, XIV, XIX and XXVIII are control tests, carried out with nothing added to the dough (i.e., no additives). Examples VII, XV, XXI and XXX are tests, in which the sucroglyceride is deposited on a sugar support. In order to detect the role of the different support materials used, Examples VIII-X, XXII-XXIV and XXXI-XXXIII are tests carried out using only the caseinate support, the maltodextrin support, or a caseinate-maltodextrin support. Finally, tests of the sucroglyceride on a support of the caseinate or the maltodextrin alone are carried out in Examples XI, XII, XVI, XVII, XXV, XXVI, XXXIV and XXXV.

For all of the following Examples V-XXXVI, there are set forth below the characteristics of the various ingredients used, as well as the general test conditions used.

Ingredients

The flour

A single batch of wheat flour of type 55 having:

| ash | 0.53% |
| W (force) | 110 |
| proteins | 11.3% |
| humidity | 14% |

The sugar support

An invert sugar obtained by acid hydrolysis of sucrose and having the appearance of a very unctuous white paste and the following analysis:

| Brix - refractometric | 79.90 |
| solids | 81.66% (including 39.48% dextrose, 39.48% levulose and 2.70% residual sucrose) |
| density (g/cc) | 1.411 |
| pH | 5.5 |

The sucroglyceride on the sugar support

A thick paste of yellow color having the following composition:

| sucroglyceride | 40% |
| invert sugar | 30% |
| water | 30% |

The sucroglyceride on the caseinate support

A powder having the following composition:

| sucroglyceride | 50% |
| caseinate | 50% |

The sucroglyceride on the maltodextrin support

A powder having the following composition:

| sucroglyceride | 36.5% |
| maltodextrin | 63.5% |

The caseinate and maltodextrin support

A powder having a composition specified in Examples X, XXIV and XXXIII.

General Test Conditions

All the Examples V-XXXVI, which follow, are carried out at constant ambient temperature of 22° C., and the apparatus and ingredients are maintained at this temperature. The methods of operation follow those recommended by the manufacturers of the apparatus used, i.e., the BRABENDER farinograph, CHOPIN alveograph, BRABENDER amylograph, and CHOPIN zymotachygraph. The Examples using the sucroglyceride are carried out with the same amount of active material, (i.e., 0.8%, referred to the flour, which is the average dose commonly used in baking industries). When the sucroglyceride on a support is used or just a support is used in the Examples, a weight of flour equal to the weight of the support is removed from the recipe.

EXAMPLES V to XIII

In this series of Examples, different combinations of the sucroglyceride and the support materials as additives to dough, are compared using the BRABENDER farinograph. For these comparative tests, the following recipe for a snack-type cracker dough is used:

| | |
|---|---|
| flour | 200 g |
| ammonium carbonate | 4 g |
| salt | 2 g |
| sucrose syrup (50% by weight) | 106 g |
| vegetable fat (margarine) | 15 g |
| additive tested | X. |

The following additives are incorporated into the cracker dough recipe in the amounts ("X") set forth below:

Example V: No additive
Example VI: 1.6 g of sugar support
Example VII: 4.0 g of sucroglyceride on sugar support
Example VIII: 1.6 g of caseinate
Example IX: 2.8 g of maltodextrin
Example X: 1.6 g of caseinate and 0.8 g of maltodextrin
Example XI: 3.2 g of sucroglyceride on caseinate support
Example XII: 4.4 g of sucroglyceride on maltodextrin support
Example XIII: 4.0 g of powder preparation of Example I.

The tests in Examples V–XIII with the BRABENDER farinograph are carried out by a method which will be described only briefly since it is well known and described in the literature. See "Contrôle de la Qualité de Blé—Guide Pratique" ["Control of the Quality of Wheat—a Practical Guide"], published by the Institut Technique des Cereales et des Fourrages, Paris, pp. 145-148 (1972). The BRABENDER farinograph measures and records the development of the consistency of dough upon intensive kneading. The apparatus consists of a kneader, the two arms of which, operating in opposite directions (WERNER-type kneader), are driven by a dynamometric motor. The apparatus continuously indicates the resistance of the dough to the torque from the movement of the arms. Upon each half-revolution of the arms, the dough, which is alternately compressed and stretched, opposes a periodically variable resistant torque which oscillates around an average value. A synchronous recording drum produced a special diagram, known as a farinogram, which is a curve indicating the variation of the consistency of the dough, expressed in BRABENDER units, as a function of the kneading time, expressed in minutes.

In each test, powdered flour, ammonium carbonate and salt are placed into the tank of the kneader. The sucrose syrup is added, and kneading is then carried out for 2 minutes at 30 rpm. The fat, as well as the additive to be tested, are added. The kneading is then resumed for 5 minutes at 30 rpm.

The results of the tests in Examples V–XIII are set forth below in Table 1. The results are expressed in the following manner:
consistency of the dough, i.e., the consistency noted on the farinogram at the end of the final five-minute kneading;
thinning of the dough, i.e., the difference in consistency between the control test (Example V) and the test in question; and
coherence of the dough, i.e., the thickness of the farinogram curve, recording the viscosity of the dough, at the end of the kneading—a wide line indicating that the dough lacks coherance and is therefore poorly bound and lacks homogeneity.

TABLE 1

| Example | Additive tested | Consistency of the dough (Brabender units) | Thinning of the dough (Brabender units) | Coherence of the dough (Brabender units) |
|---|---|---|---|---|
| V | No additive | 735 | — | 45 |
| VI | Sugar support | 710 | 25 | 35 |
| VII | Sucroglyceride on sugar support | 660 | 75 | 30 |
| VIII | Caseinate | 705 | 30 | 35 |
| IX | Maltodextrin | 630 | 105 | 40 |
| X | Caseinate and maltodextrin | 810 | −85 | 45 |
| XI | Sucroglyceride on caseinate support | 830 | −95 | 45 |
| XII | Sucroglyceride on maltodextrin support | 560 | 175 | 35 |
| XIII | Powder preparation of Example I | 690 | 45 | 25 |

From these results, it is seen that, on the caseinate support, the sucroglyceride gives a greater dough consistency than the control (no additive). On the sugar support, the consistency is somewhat less. On the maltodextrin support, the consistency is significantly less. By themselves, the support materials (i.e., the maltodextrin, caseinate and sugar) reduce consistency. By itself, the caseinate with maltodextrin gives a consistency higher than that of the control. The powder preparation of this invention of Example I, however, gives a lower dough consistency than the control.

With regard to the coherence of the dough, the sucroglyceride improves it on the sugar support and on the maltodextrin support. The sucroglyceride has no effect on the caseinate support. Nor does the caseinate with maltodextrin have any effect. However, the powder preparation of this invention of Example I gives the best dough coherence and shows a synergistic effect.

The improved coherence, provided dough by the powder preparation of this invention of Example I, is very important in dough for making dry crackers and lining pastry. A lack of coherence in such dough leads to internal stresses during and after baking, which result in manufacturing flaws such as cracks. The emulsifying power of a sucroglyceride, which is greatly reinforced in the powder preparation of this invention, makes the powder preparation of this invention particularly suitable for solving such problems.

The improved coherence, provided dough by the powder preparation of this invention of Example I, is also important because it indicates that the dough is more homogeneous. As a result, kneading time can be reduced, thereby saving energy. A further energy saving also can be realized because the dough is made less viscous by the powder preparation of this invention.

EXAMPLES XIV to XVIII

In this series of Examples, different combinations of the sucroglyceride and the support materials as additives to dough, as compared using the CHOPIN alveograph. For these comparative tests, a ball of dough is prepared using 250 g of flour, to which there is added an amount of salted water of 25 g/L, so as to obtain a dough having a constant hydration of 50%. The following amounts of additives are incorporated into the dough:

Example XIV: No additive
Example XV: 5 g of sucroglyceride on sugar support
Example XVI: 4 g of sucroglyceride on caseinate support
Example XVII: 5.5 g of sucroglyceride on maltodextrin support
Example XVIII: 5.7 g of the powder preparation of Example II.

The tests in Examples XIV–XVIII with the CHOPIN alveograph are carried out in a well known manner as described in the literature. See "Contrôle de la Qualité de Blé—Guide Pratique" ["Control of the Quality of Wheat—a Practical Guide"], published by the Institut Technique des Cereales et des Fourrages, Paris, pp. 135–143 (1972). The CHOPIN alveograph subjects a thin layer of dough to changes in size under the thrust of an increasing volume of air. A bubble is formed, and the pressure within this bubble is recorded as a function of the volume of air blown in until rupture. A diagram is obtained on a recording cylinder, from which there are derived the characteristics intimately related to the rheological properties of the dough. Empirical correlations show that the value P (mm) provides a good measure of the tenacity (i.e., stability and resistance related to elasticity) of the dough, while the length L (cm) or the swelling G (cc) gives a good measure of the stretchability of the dough before rupture. The calculated total surface W, which is the measure of the deformation work carried out before rupture, gives a good indication of the "force" of the flour.

The results of the tests in Examples XIV–XVIII are set forth below in Table 2.

TABLE 2

| Example | Additive tested | Tenacity P (mm) | Swelling G (cc) | Force W ($10^3$ ergs) | P/L |
|---|---|---|---|---|---|
| XIV | No additive | 49.6 | 16.5 | 110 | 0.9 |
| XV | Sucroglyceride on sugar support | 45 | 18.4 | 109 | 0.67 |
| XVI | Sucroglyceride on caseinate support | 43.8 | 17.2 | 106.5 | 0.58 |
| XVII | Sucroglyceride on maltodextrin support | 46.2 | 17.8 | 108 | 0.81 |
| XVIII | Powder preparation of Example II | 39 | 20 | 107 | 0.48 |

From these results, it is seen that, for practically the same force, the powder preparation of this invention of Example II modifies the characteristics of dough the most by reducing the tenacity of the dough, increasing its swelling, and considerably reducing its P/L ratio. As a result, the powder preparation of this invention provides a softer and longer dough that is easier to work. Such a dough is of particular benefit whenever it is necessary to make products of geometrical shapes, for which shrinkage results is deformations which are harmful to the quality of the finished product.

EXAMPLES XIX to XXVII

In this series of Examples, different combinations of the sucroglyceride and the support materials are compared as additives to dough, using the BRABENDER amylograph. In these comparative tests, a dough is prepared from 80 g of flour in 450 cc of water, and the following amounts of additives are incorporated into the dough:

Example XIX: No additive
Example XX: 0.65 g of sugar support
Example XXI: 1.6 g of sucroglyceride on sugar support
Example XXII: 0.65 g of caseinate
Example XXIII: 1.1 g of maltodextrin
Example XXIV: 1.45 g of caseinate and 1.1 g of maltodextrin
Example XXV: 1.3 g of sucroglyceride on caseinate support
Example XXVI: 1.75 g of sucroglyceride on maltodextrin support
Example XXVII: 3.2 g of the powder preparation of Example III.

The tests in Examples XIX–XXVII with the BRABENDER amylograph are carried out in a well known manner as described in the literature. See "Contrôle de la Qualité de Blé-Guide Pratique", published by the Institut Technique des Cereales et des Fourrages, Paris, pp. 149–152 (1972). The BRABENDER amylograph is a torsion viscometer which records the variations in viscosity of a very fluid flour dough subjected to a uniform increase in temperature. The apparatus records, in succession, a gelation of the starch of the dough, an increase in the viscosity of the starch, and the activating of the alpha-amylase. The starch then liquefies gradually, and its viscosity decreases. The apparatus records, as a curve, the variation of the viscosity of the starch, passing through a maximum, the ordinate of which is a function of the amylolytic activity of the flour. On the basis of this curve, the gelatin parameters and maximum and minimum viscosities of the dough are determined.

The results of the tests in Examples XIX–XXVII are set forth below in Table 3.

TABLE 3

| | | Start of Gelation | | Maximum Viscosity | | | Minimum Viscosity |
|---|---|---|---|---|---|---|---|
| Example | Additive tested | Time (minutes) | Temp. (°C.) | Time (minutes) | Temp. (°C.) | Viscosity (BRABENDER units) | Viscosity (BRABENDER units) |
| XIX | No additive | 21 | 56 | 42 | 87 | 570 | 220 |

TABLE 3-continued

| Example | Additive tested | Start of Gelation Time (minutes) | Start of Gelation Temp. (°C.) | Maximum Viscosity Time (minutes) | Maximum Viscosity Temp. (°C.) | Maximum Viscosity Viscosity (BRABENDER units) | Minimum Viscosity Viscosity (BRABENDER units) |
|---|---|---|---|---|---|---|---|
| XX | Sugar support | 23 | 56 | 45 | 90 | 600 | 220 |
| XXI | Sucroglyceride on sugar support | 22 | 56 | 46 | 94 | 700 | 380 |
| XXII | Caseinate | 24 | 57 | 45 | 90 | 600 | 200 |
| XXIII | Maltodextrin | 22 | 57 | 44 | 91 | 610 | 200 |
| XXIV | Caseinate and maltodextrin | 23 | 57 | 45 | 91 | 560 | 200 |
| XXV | Sucroglyceride on caseinate support | 23 | 56 | 48 | 93 | 740 | 400 |
| XXVI | Sucroglyceride on maltodextrin support | 23 | 57 | 46 | 93 | 720 | 370 |
| XXVII | Powder preparation of Example III | 22 | 56 | 47 | 93 | 770 | 420 |

From these results, it is seen that none of the additives, tested, has any effect on the start of gelation, which is an inherent characteristic of the starch of the flour used in the dough, and with all the additives, the maximum viscosity is obtained later and at higher temperatures than with the control (no additive). However, the powder preparation of this invention of Example III gives the highest maximum viscosity, while the support materials, alone or in mixture, have very little effect. Likewise, the support materials have little effect on the minimum viscosity (measured after a 1 minute dwell time of the dough at 100° C. during the course of its cooling at the rate of 1.5° C./min.), while the highest minimum viscosity is also obtained with the powder preparation of this invention of Example III. It is found, therefore, that the protective effect of the sucroglyceride with respect to starch (i.e., the delay in gelation and the reduced attack by the amylase) is particularly pronounced with the powder preparation of this invention of Example III. The pronounced protective effect of the powder preparation of this invention substantially retards baked products becoming stale.

EXAMPLES XXVIII to XXXVI

In this series of Examples, different combinations of the sucroglyceride and the support materials, as additives to dough, are compared for their effect on the fermentation and tolerance of dough, using the CHOPIN zymotachygraph. In these comparative tests, a ball of dough is prepared from:

| flour | 200 g |
| salt | 4 g |
| baker's yeast | 4 g |
| water | 110 cc |
| additive tested | X. |

The following additives are incorporated into the dough in the amounts ("X") set forth below:
Example XXVIII: No additive
Example XXIX: 1.6 g of sugar support
Example XXX: 4.0 g of sucroglyceride on sugar support
Example XXXI: 1.6 g of caseinate
Example XXXII: 2.8 g of maltodextrin
Example XXXIII: 0.8 g of caseinate and 2.95 g of maltodextrin
Example XXXIV: 3.2 of sucroglyceride on caseinate support
Example XXXV: 4.4 g of sucroglyceride on maltodextrin support
Example XXXVI: 5.3 g of powder preparation of Example IV.

The tests in Examples XXVIII-XXXVI with the CHOPIN zymotachygraph are carried out by a method which will be described only briefly since it is well known and described in the literature. See Kiger and Kiger, "Techniques Modernes de la Biscuiterie Pâtisserie", Boulangerie Industrielles et Artisanales et des Produits de Regimé, DUNOD, Paris, volume 1, pp. 128-131 (1968). The CHOPIN zymotachygraph is an apparatus which can record the rate of formation of the principal gas (i.e., carbon dioxide), formed within dough which is fermenting due to the action of biological yeast. The apparatus consists essentially of a thermostatized tank, in which a sample of the dough is placed, an automatic valve system, carbon dioxide absorber and a recording device. The valve system, combined with the carbon dioxide absorber, permits the recording of the total volume of gas (air + $CO_2$) and the total volume of just carbon dioxide, discharged from the tank. The coefficient of retention (which is the amount of carbon dioxide retained within the ball of dough, as compared with the total gas volume evolved by the dough) can then be determined. The zymotachygraph makes it possible to follow the course of the fermentation of the dough and to determine whether the additives tested have a favorable or unfavorable effect on the liberation of carbon dioxide from the dough.

The results of the tests in Examples XXVIII-XXXVI are set forth below in Table 4.

TABLE 4

| Example | Additive tested | Start of the porosity to $CO_2$ (minutes) | Total gas volume (cc) | Coefficient of retention (%) |
|---|---|---|---|---|
| XXVIII | No additive | 92 | 1,578 | 71.1 |
| XXIX | Sugar support | 92 | 1,281 | 85.1 |
| XXX | Sucroglyceride on sugar support | 34 | 1,573 | 61.8 |
| XXXI | Caseinate | 40 | 1,232 | 83.1 |
| XXXII | Maltodextrin | 95 | 1,345 | 72.7 |
| XXXIII | Caseinate and maltodextrin | 87 | 1,531 | 73.7 |
| XXXIV | Sucroglyceride on caseinate support | 26 | 1,624 | 59.1 |
| XXXV | Sucroglyceride on | | | |

TABLE 4-continued

| Example | Additive tested | Start of the porosity to $CO_2$ (minutes) | Total gas volume (cc) | Coefficient of retention (%) |
|---|---|---|---|---|
| | maltodextrin support | 80 | 1,486 | 64 |
| XXXVI | Powder preparation of Example IV | 110 | 1.637 | 83.7 |

From these results, it is seen that the addition of the sucroglyceride generally increases the porosity of the dough. This is shown by the faster occurrence of the escape of carbon dioxide (i.e., the faster start of the porosity to $CO_2$) whether the sucroglyceride is on the caseinate support, the maltodextrin support or the sugar support. By themselves, the sugar and maltodextrin have no effect, but the caseinate increases the porosity. The caseinate with maltodextrin very slightly increases the porosity. However, the powder preparation of this invention of Example IV substantially delays the porosity of the dough by about 18 minutes or 20% as compared with the control (no additive). This unexpected effect is contrary to the effect of each of the components of the powder preparation of this invention, taken by itself or in mixture.

The sucroglyceride also tends to increase the total gas volume liberated while the support materials tend to reduce it. The caseinate with maltodextrin liberates slightly less gas volume than the control. The powder preparation of this invention of Example IV gives the best liberation of gas, which is another synergistic effect thereof.

The retention of carbon dioxide, which is related to the porosity of the dough, is generally decreased by the sucroglyceride when it is on a single support material, whether sugar, caseinate or maltodextrin. The caseinate with maltodextrin causes a retention which is slightly greater than the control. The powder preparation of this invention of Example IV provides the best coefficient of retention. This is also surprising in view of the decreased carbon dioxide retention, produced by the sucroglyceride on a single support material. The use of the powder preparation of this invention therefore results in a better tolerance of the dough to fermentation and in a final product which is more developed and has a more aerated structure, due to the better gas retention of the dough, from which it was made.

Thus, based on the results in the preceding Examples V-XXXVI, the ternary sucroglyceride/caseinate/maltodextrin powder preparation of this invention produces:

(1) a reversal of the trend of (a) the sucroglyceride, (b) the support materials, (c) the sucroglyceride on one of the support materials and (d) mixtures of the support materials, whereby there is less escape of gas from dough and a better retention coefficient;

(2) a more homogeneous dough having reduced viscosity;

(3) a particularly high complexing action with respect to the starch of the dough flour, which results in a substantial delay in gelation and an increased protective role with respect to the action of the amylases; and (4) a substantial modification of the alveograph diagram of dough flour, in particular by considerably reducing the characteristic P/L ratio without significantly modifying the force (W).

It is considered that this invention and many of its attendant advantages will be understood from the foregoing description and that it will be apparent that various changes may be made in the embodiments of the sucroglyceride powder preparation of this invention, in the process of obtaining the powder preparation and in the use of the powder preparation, as hereinbefore described, without departing from the spirit and scope of the invention or sacrificing all of its material advantages; the embodiments, hereinbefore described, being merely preferred embodiments.

We claim:

1. A powder preparation, comprising 20 to 40% of a sucroglyceride on a support, said support comprising 10 to 50% of an edible salt of casein, and 20 to 60% of a maltodextrin.

2. The powder preparation of claim 1 wherein the sucroglyceride is a palm oil, tallow, lard or copra oil sucroglyceride.

3. The power preparation of claim 1 wherein the edible salt of casein is sodium caseinate.

4. The powder preparation of claim 1 wherein the maltodextrin has a dextrose equivalent of 3 to 40.

5. The powder preparation of claim 4 wherein the maltodextrin has a dextrose equivalent of 6 to 30.

6. The powder preparation of claim 5, wherein the sucroglyceride is a palm oil, tallow, lard or copra oil sucroglyceride.

7. A process for obtaining the powder preparation of claim 1 comprising, drying an aqueous emulsion which comprises the sucroglyceride, the edible salt of casein and the maltodextrin.

8. The process of claim 7, comprising spray drying the aqueous emulsion.

9. The process of claim 8, comprising homogenizing the aqueous emulsion before it is spray dried.

10. The process of claim 9 wherein the aqueous emulsion is obtained by adding the sucroglyceride, in a molten state, to an aqueous solution which comprises the edible salt of casein and the maltodextrin.

11. A process for obtaining the powder preparation of claim 1 comprising, mixing the maltodextrin, in the form of a powder, with the sucroglyceride on the edible salt of casein, in the form of a powder.

12. The process of claim 11 wherein the sucroglyceride on the edible salt of casein, in the form of a powder, is obtained by spray drying an aqueous emulsion which comprises the sucroglyceride and the edible salt of casein.

13. The process of claim 12 wherein the aqueous emulsion is obtained by adding the sucroglyceride, in a molten state, to an aqueous solution which comprises the edible salt of casein.

14. The process of claim 13, comprising homogenizing the aqueous emulsion before it is spray dried.

15. A process for obtaining the powder preparation of claim 1 comprising, mixing the edible salt of casein, in the form of a powder, with the sucroglyceride on the maltodextrin, in the form of a powder.

16. The process of claim 15 wherein the sucroglyceride on the maltodextrin, in the form of a powder, is obtained by spray drying an aqueous emulsion which comprises the sucroglyceride and the maltodextrin.

17. The process of claim 16 wherein the aqueous emulsion is obtained by adding the sucroglyceride, in a molten state, to an aqueous solution which comprises the maltodextrin.

18. The process of claim 17, comprising homogenizing the aqueous emulsion before it is spray dried.

19. A dough, comprising a grain flour and the powder preparation of claim 1, 2, 3, 4, 5 or 6.

20. The dough of claim 19 which contains an amount of the powder preparation, such that the weight of the sucroglyceride is 0.3 to 2% of the weight of the flour.

21. A process for baking a dough which comprises a grain flour, comprising, incorporating in the dough, before baking, the powder preparation, of claim 1, 2, 3, 4, 5 or 6.

22. The process of claim 21 wherein the amount of the powder preparation in the dough is such that the weight of the sucroglyceride is 0.3 to 2% of the weight of the flour.

* * * * *

UNITED STATES PATENT AND TRADEMARK OFFICE
CERTIFICATE OF CORRECTION

PATENT NO. : 4,380,555

DATED : April 19, 1983

INVENTOR(S) : Campagne et al.

It is certified that error appears in the above—identified patent and that said Letters Patent is hereby corrected as shown below:

Col. 2, line 51, insert after "disturbing" the following -- amounts of impurities which might -- .

Col. 4, line 19, insert after "sucroglyceride" the following -- is first melted (e.g., in -- .

Col. 7, line 4, change "place" to -- placed -- .

Col. 11, line 7, change "as" to -- are -- .

Col. 16, line 20, change "power" to -- powder -- .

Signed and Sealed this

Twenty-ninth Day of November 1983

[SEAL]

Attest:

GERALD J. MOSSINGHOFF

*Attesting Officer*  *Commissioner of Patents and Trademarks*